(12) United States Patent
Saiki

(10) Patent No.: US 11,584,476 B2
(45) Date of Patent: Feb. 21, 2023

(54) ELECTRIC BICYCLE MOTOR SYSTEM

(71) Applicant: Neal Saiki, Santa Cruz, CA (US)

(72) Inventor: Neal Saiki, Santa Cruz, CA (US)

(73) Assignee: MSNS, LLC, Morgan Hill, CA (US)

( * ) Notice: Subject to any disclaimer, the term of this patent is extended or adjusted under 35 U.S.C. 154(b) by 420 days.

(21) Appl. No.: 16/541,130

(22) Filed: Aug. 14, 2019

(65) Prior Publication Data

US 2020/0079470 A1    Mar. 12, 2020

Related U.S. Application Data

(60) Provisional application No. 62/785,263, filed on Dec. 27, 2018, provisional application No. 62/718,921, filed on Aug. 14, 2018.

(51) Int. Cl.
| | | |
|---|---|---|
| *B62M 6/70* | (2010.01) | |
| *H02K 1/12* | (2006.01) | |
| *H02K 7/116* | (2006.01) | |

(52) U.S. Cl.
CPC ............. *B62M 6/70* (2013.01); *H02K 1/12* (2013.01); *H02K 7/116* (2013.01)

(58) Field of Classification Search
CPC . B62M 6/70; B62M 6/45; B62M 9/02; B62M 6/60; H02K 1/12; H02K 7/116; B62K 19/40
See application file for complete search history.

(56) References Cited

U.S. PATENT DOCUMENTS

| | | | |
|---|---|---|---|
| 3,921,745 | A | 11/1975 | McCulloch et al. |
| 6,347,682 | B1 | 2/2002 | Buchner |
| 6,616,422 | B2 | 9/2003 | Hsieh |
| 8,573,347 | B2 | 11/2013 | Kohlbrenner |
| 2003/0111284 | A1 | 6/2003 | Chou et al. |
| 2005/0016785 | A1 | 1/2005 | Young |
| 2006/0240920 | A1 | 10/2006 | Urabe |
| 2010/0117327 | A1 | 5/2010 | Hadley |
| 2011/2477888 | | 10/2011 | Kohlbrenner |
| 2014/0245852 | A1 | 9/2014 | Lang |
| 2015/0369316 | A1* | 12/2015 | Muehlbauer .......... F16D 65/123 188/72.1 |
| 2016/0096587 | A1 | 4/2016 | Bachman et al. |
| 2020/0283093 | A1* | 9/2020 | Saiki ................... B62M 6/70 |

FOREIGN PATENT DOCUMENTS

| | | |
|---|---|---|
| DE | 199 29 613 A1 | 1/2001 |
| DE | 102012205841 A1 | 11/2013 |
| DE | 20 2016 104737 U1 | 9/2016 |

(Continued)

*Primary Examiner* — Kevin Hurley
*Assistant Examiner* — Marlon A Arce
(74) *Attorney, Agent, or Firm* — Michael A. Guth

(57) ABSTRACT

An electric motor bicycle system with an electric motor driven gear adapted to drive a wheel gear coupled to a bicycle hub. The motor driven gear is coupled to the wheel gear with a chain. The chain may be tensioned with one or more tensioners, which allow for a tighter system geometry. The motor may be supported with a bracket adapted to mount to industry standard disc brake mounting interfaces. In some aspects, the motor driven gear is coupled to the disc mounting interface of a wheel hub. In some aspects, the electric motor bicycle system may also have a disc brake system integrated therein.

41 Claims, 20 Drawing Sheets

(56) References Cited

FOREIGN PATENT DOCUMENTS

| | | |
|---|---|---|
| DE | 102016113572 B3 | 12/2017 |
| EP | 1 063 162 A1 | 12/2000 |
| EP | 2 412 621 A2 | 2/2012 |
| EP | 3 323 655 A1 | 5/2018 |
| FR | 3030495 A1 | 2/2017 |
| GB | 2 453 039 A | 3/2009 |

\* cited by examiner

ELECTRIC BICYCLE MOTOR SYSTEM

CROSS-REFERENCE TO RELATED APPLICATIONS

This application claims priority to U.S. Provisional Patent Application No. 62/718,921 to Saiki, filed Aug. 14, 2019, which is hereby incorporated by reference in its entirety. This application claims priority to U.S. Provisional Patent Application No. 62/785,263 to Saiki, filed Dec. 27, 2019, which is hereby incorporated by reference in its entirety.

BACKGROUND

Field of the Invention

The present invention relates to electric transport, and more specifically to an electrically powered bicycle motor system.

Description of Related Art

Motivated by the environmental, public health, ecological, and carbon-footprint issues associated with gasoline-powered automobiles, researchers, governments, and society as a whole have been engaged in a search for viable alternatives. Electric bicycles (e-bikes), which are propelled by a combination of pedaling and battery-powered electric motors, are a promising alternative to automobile transportation. Their primary advantages include lower purchase and operating costs compared to cars, ability to travel longer distances and with less physical effort compared to traditional bicycles, and zero emissions during operation.

Regenerative braking is a unique technique that is used in EVs to capture energy that the vehicle has due to its motion or, in other words, its kinetic energy that would have been wasted when the vehicle decelerates while braking. By taking a measure of the initial and final vehicle velocity, the amount of kinetic energy which is lost to braking can be calculated.

Urban drive cycles have a considerable amount of acceleration and decelerating periods due to traffic control systems in place around towns and cities, and therefore, when decelerating, significant energy is lost. However, with regenerative braking, this energy can be captured, and 'waste' energy can be harnessed and utilized for vehicle propulsion. Similarly, off road cycles also have a considerable need for acceleration and deceleration due to climbing and descending hills.

SUMMARY OF THE INVENTION

Figure 1:
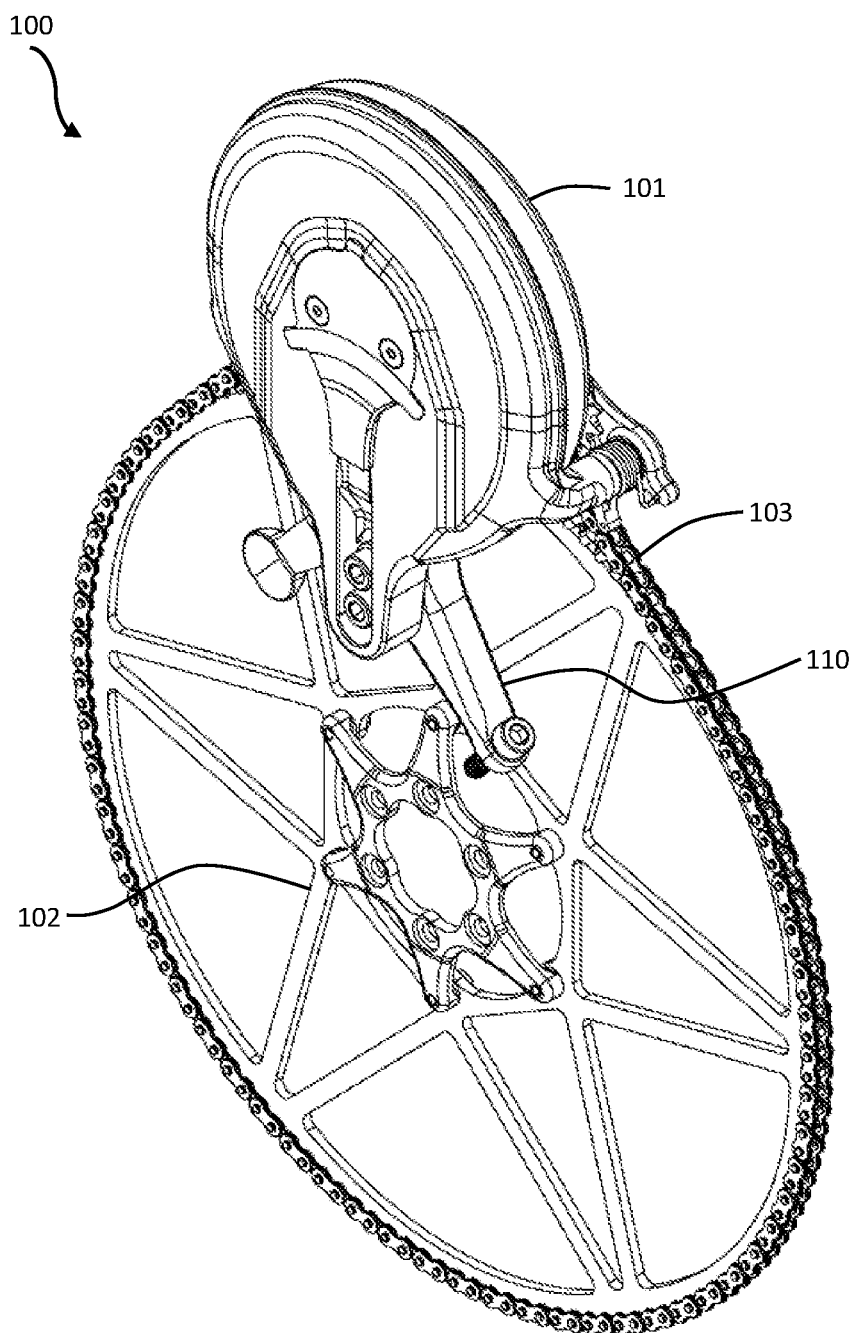
FIG. 1 is an isometric view of an electric bicycle motor system according to some embodiments of the present invention.

An electric motor bicycle system with an electric motor driven gear adapted to drive a wheel gear coupled to a bicycle hub. The motor driven gear is coupled to the wheel gear with a chain. The chain may be tensioned with one or more tensioners, which allow for a closely spaced system geometry. The motor may be supported with a bracket adapted to mount to industry standard disc brake mounting interfaces. In some aspects, the motor driven gear is coupled to the disc mounting interface of a wheel hub. In some aspects, the electric motor bicycle system may also have a disc brake system integrated therein. The electric motor bicycle system may include a regenerative braking system, which may be a fully proportional regenerative braking system.

DETAILED DESCRIPTION

In some embodiments of the present invention, as seen in FIGS. 1, 3, 4, and 5, an electric bicycle motor system 100 couples a motor unit 101 to drive gear 102 with a drive chain 103. The motor unit 101 is coupled to a mounting bracket 110, which is adapted to mount the motor unit 101 to a bicycle. In some aspects, the mounting bracket 110 is adapted to mount the rear disc brake mounting interface 107 of the bicycle. In some aspects, the mounting bracket 110 is adapted to mount to an industry standard brake mounting interface. With such a system, a non-electric bicycle may be converted into an electric bicycle. In some aspects, the electric bicycle system is adapted to be mounted to a customized mounting interface.

Figure 2A:
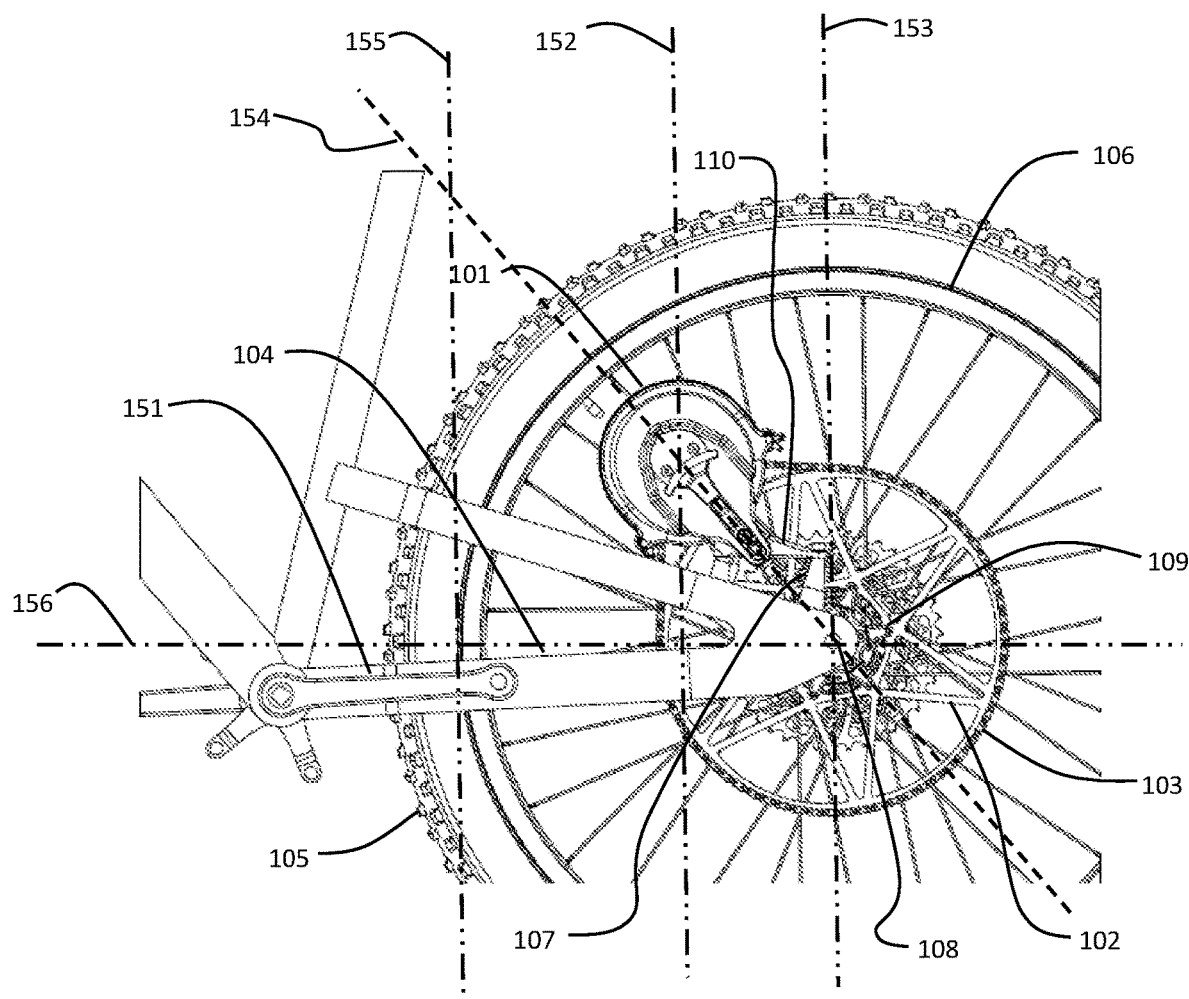
FIG. 2A is a left side view of a bicycle with an electric bicycle motor system mounted thereon according to some embodiments of the present invention.
Figure 2B:
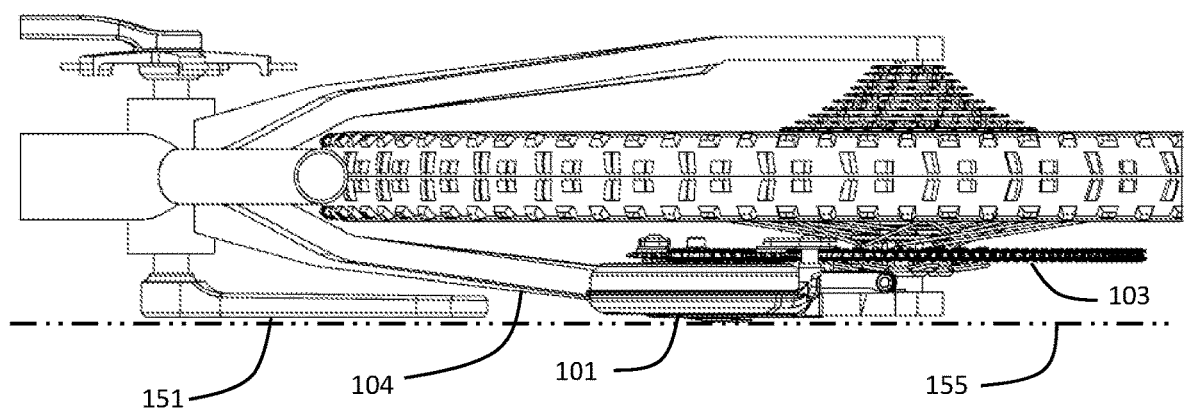
FIG. 2B is a top view of a bicycle with an electric bicycle motor system mounted thereon according to some embodiments of the present invention.

In an exemplary application, as seen in FIGS. 2A and 2B, an electric bicycle system 100 may be installed onto an existing bicycle designed to accommodate a rear disc brake system. A rear wheel assembly on a bicycle may include a rim 106 with a tire 105 mounted thereon. The rim 106 may be coupled to a hub which includes a disc mounting interface 109. A rear disc brake mounting interface 107 may reside on the rear portion of the frame 104. Instead of installing the rear disc and the rear disc brake mechanism, the mounting interface 119 of a gear 102 may be mounted onto the rear hub's disc interface 109. A bracket 110 adapted to support a motor unit 101 is mounted onto the disc mounting interface 109, and the motor unit 101 is coupled to the bracket 110. In this way, the electric bicycle system 100 is easily incorporated into an industry standard bicycle without any rework or additional mounting changes or brackets required. The use of the electric bicycle system as a rear brake braking system obviates the need for the rear disc brake, allowing for the use of disc and disc brake mechanism mounting interfaces for the drive gear 102 and the motor unit 101 and motor bracket 110. In some aspects, there is no other rear braking mechanism on the bicycle other than that of the motor unit used as a brake. In some aspects, the gear 102 is mounted onto a wheel hub mounting interface and the gear interface consists of a six hole pattern with holes of approximately 5 m diameter on a bolt circle with a 44 mm diameter.

The rotational axis 108 of the rear wheel 106, which is coaxial to the rotational axis of the drive gear 102, is marked along a front to back axis of the bicycle by a station 153, and indicated in FIG. 2A. In some aspects, the bicycle frame is constructed such that the rear wheel will mount into a fixed position in the frame, such that the frame will have a rear wheel mounting axis which will be coaxial to the rear wheel rotational axis when the bicycle is assembled. A longitudinal axis 156 of the bicycle is used to represent positional stations of components with regard to a front to rear aspect. The rotational axis of the motor unit 101 is marked along the longitudinal axis of the bicycle by a station 152, which is forward along the longitudinal axis of the bicycle relative to the station of the rotational axis of the rear wheel 153. The forward station of the motor unit center of mass relative to the rotational axis of the wheel allows for mounting of the motor unit without cantilevering the motor rearward of the rear wheel axis. In some aspects, the forward most position 155 of the wheel rim 106 along the longitudinal axis 156 represents the farthest forward location of the motor rotational axis 112. In some aspects, the motor rotational axis resides along the longitudinal position axis 156 at a station between that of the station 153 of the rotational axis 108 and the station 155 of the forward most position 155 of the wheel rim 106. In some aspects, not only is the rotational axis of the motor not further forward of the station 155 of the wheel rim 106, it is also not radially outside the wheel rim at other stations.

The rear wheel of the bicycle may have a pedal drive side, which is where the drive gear is mounted to the crank assembly. Similarly, the side of the bicycle frame which is on the side which has the pedal drive side of the crank may be referred to as the pedal drive side of the frame. In some aspects, the bicycle frame may not be symmetric from side to side, which may be due to the presence of a derailleur dropout coupled to the frame, for example.

As illustrated in FIG. 2B, the inboard edge of the pedal (not shown) which is coupled to the crank arm 151 resides at a distance perpendicular to the crank axis which is equal to or farther outboard of the outside surface of the motor unit 101. FIG. 2B is a top view of the embodiment seen in left side view in FIG. 2A. As illustrated in FIG. 2A, the motor unit 101 may have its rotational axis, and its center of mass, forward of the rotational axis of the rear wheel. In addition, the motor unit 101 may extend no farther outboard than the plane of the rotational path of the inboard edge of the pedal coupled to the crank, which will allow the foot of the user to clear the motor unit 101 in practice. In some aspects, the motor unit clears the outboard surface of the crank arm. In some aspects, the motor unit will not protrude outboard of the outboard surface of the crank arm with either a wider "Boost" crank, or with a regular "non-Boost" crankset. In some aspects, the outermost portion of the motor unit will not protrude further outboard than the outside surface of the crank arm, and the innermost surface of the motor unit will be outboard of any potentially interfering portion of the tire and wheel assembly. In some aspects, the outboard surface of the motor unit away from the center plane of the bicycle will be approximately in line with or inboard of the furthermost outside surface of the pedal crank arm. In some aspects, the innermost surface of the motor unit will be outboard of outboard surface of the wheel rim. In some aspects, the innermost surface of the motor unit will be outboard of outboard surface of the tire. The very thin nature of the motor unit allows for positioning of the motor unit in a location on the bicycle not previously obtainable.

Figure 3:
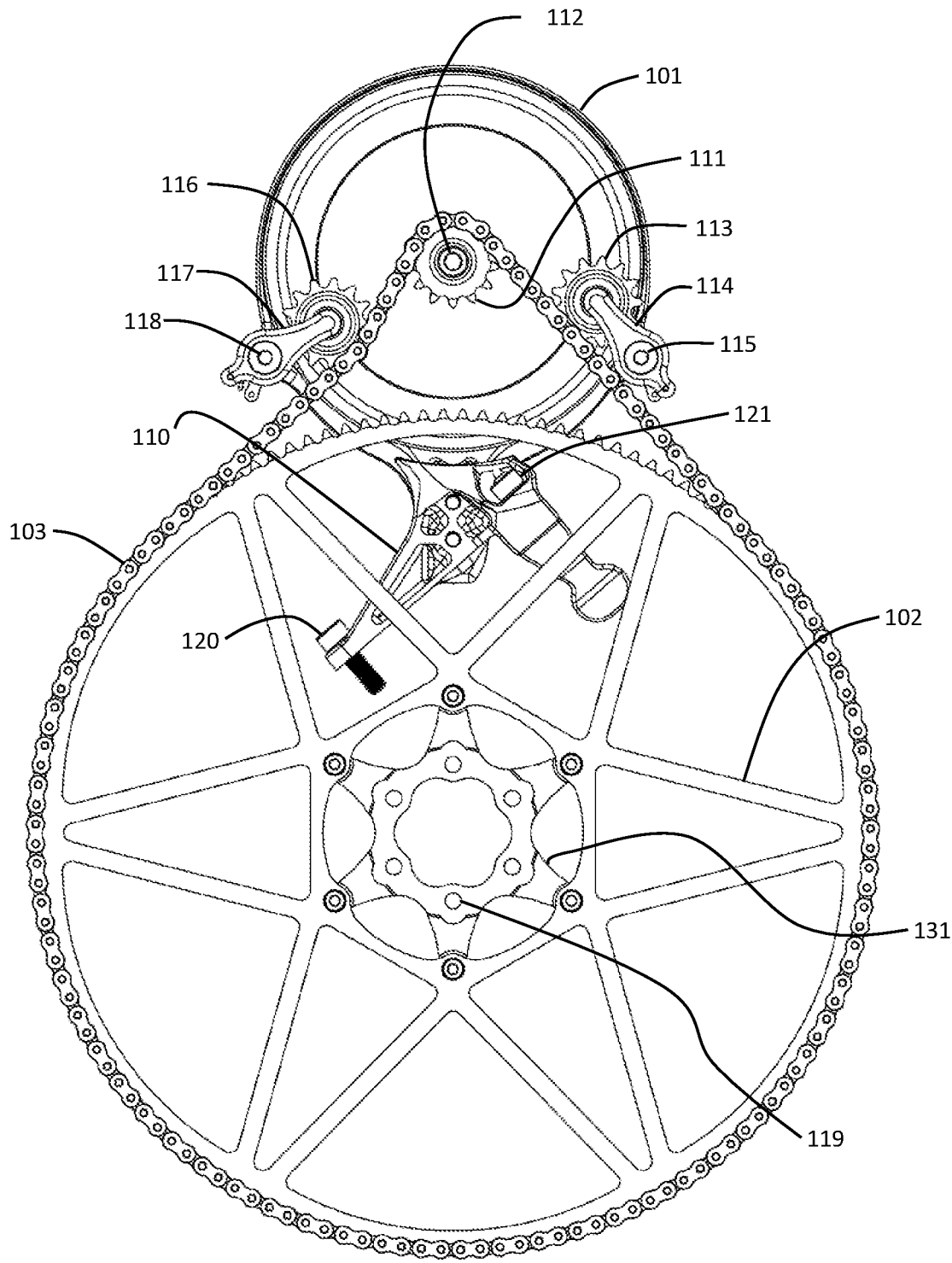
FIG. 3 is a right side view of an electric bicycle motor system according to some embodiments of the present invention.

FIG. 3 illustrates a rear view of the electric bicycle system 100 according to some embodiments of the present invention. The electric bicycle system 100 includes two tensioning mechanisms 114, 117 which allow for a significant amount of chain wrap around the pinion 111, as well as providing dynamic stability of the chain 103 both during power transmission to the rear wheel and during braking of the rear wheel by the motor under braking. The motor unit 101 may have a rotational axis 112 coupled to an exterior rotor which is coupled to a pinion 111. In some aspects, as further illustrated in FIG. 8, the motor 101 has an external rotor 135 coupled to the inboard housing 134 of the motor 101 and which spins around an inboard stator 136 which is coupled to an inner stator 136. A first tensioner 114 is coupled to a first mounting pivot interface 115 and utilizes a first spring loaded gear 113 to provide tension onto the chain 103. A second tensioner 117 is coupled to a second mounting pivot interface 118 and utilizes a second spring loaded gear 116 to provide tension onto the chain 103. The stationary outboard housing 137 of the motor unit 101 is coupled to a mounting bracket 110, which may be attached to the rear disc brake mounting interface of a bicycle with fasteners 120, 121. A drive gear mounting portion 131 is adapted to provide mounting of the drive gear 102 to the mounting interface 119 on the rear hub.

In some aspects, the center to center distance between the rotational axis of the drive gear and the rotational axis of the motor is in the range of 100 mm to 350 mm. This broadest range is roughly bounded by the minimum center to center distance between two gears and a maximum center to center distance that is bounded by the bicycle rim radius. In some aspects, the center to center distance between the rotational axis of the drive gear and the rotational axis of the motor is in the range of 125 mm to 290 mm. This intermediate range provides better minimum chain wrap and less chain length. In some aspects, the center to center distance between the rotational axis of the drive gear and the rotational axis of the motor is in the range of 150 mm to 230 mm. This narrower range provides good chain wrap and minimized chain length. In an exemplary embodiment the center to center distance is approximately 187 mm.

In this illustrative embodiment, the pinion has 13 teeth. The number of pinion teeth can be varied to provide a desirable gear ratio between the pinion and drive gear. In some aspects, the number of drive pinion teeth has a range between 9 to 30 teeth. In this illustrative embodiment, the drive gear has 133 teeth. The number of drive gear teeth can be varied to provide a desirable gear ratio between the pinion and drive gear. In some aspects, the number of drive gear teeth has a range between 60 to 200 teeth. In general, the drive gear has more teeth in order to provide a gear ratio that allows for the pinion to rotate faster than the drive gear thus providing for a gear reduction.

In an exemplary embodiment, the chain has a pitch of ¼ of an inch. This is a standardized chain pitch. In other aspects, there are other smaller or larger standardized chain pitches that would be function correctly. Chain pitches in Imperial units, metric units, or non-standardized pitches could also be utilized. The approximate diameter of the pinion and drive gear is determined by the number of teeth times the chain pitch plus some additional diameter for tooth shape.

Figure 4:
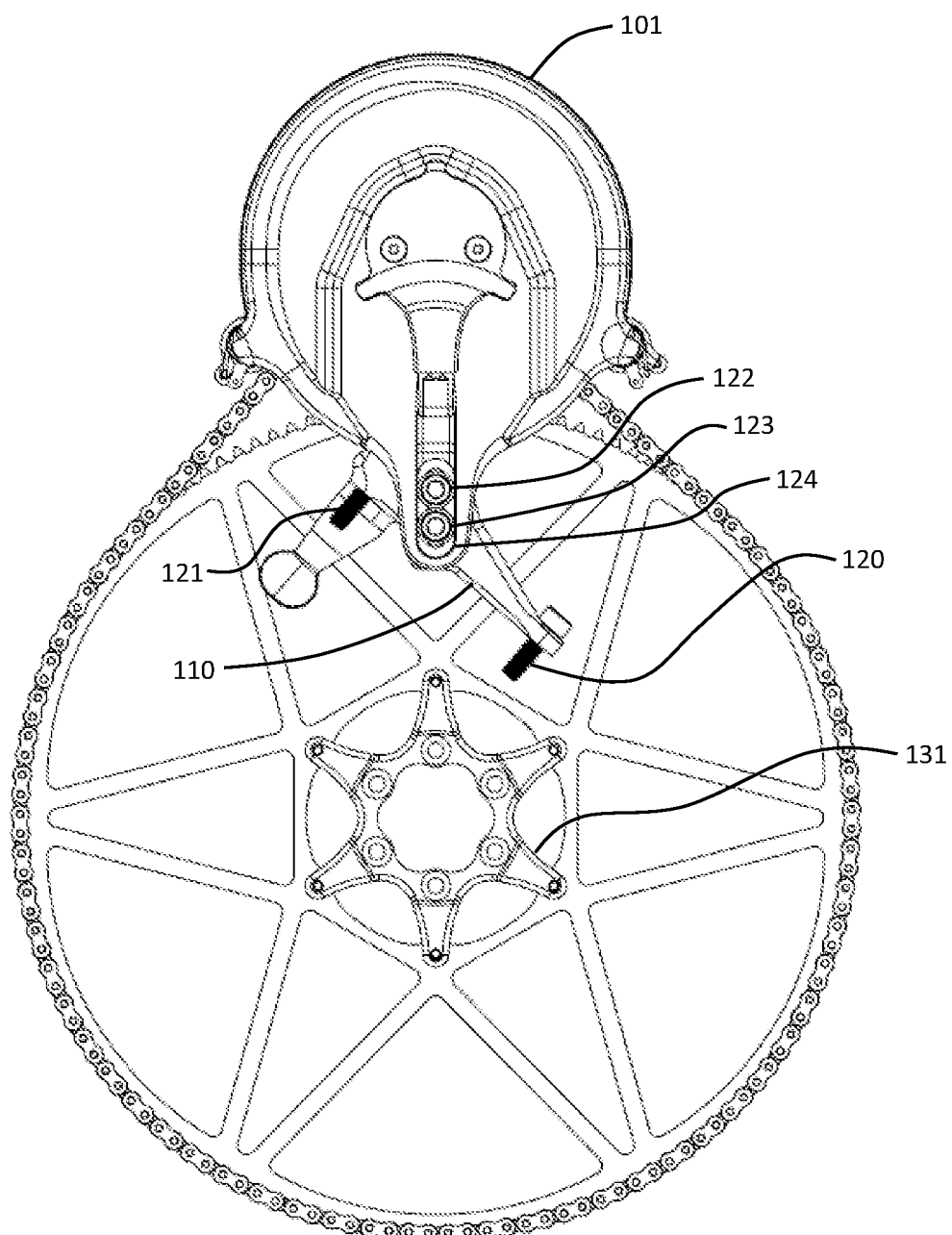
FIG. 4 is a left side view of an electric bicycle motor system according to some embodiments of the present invention.
Figure 5:
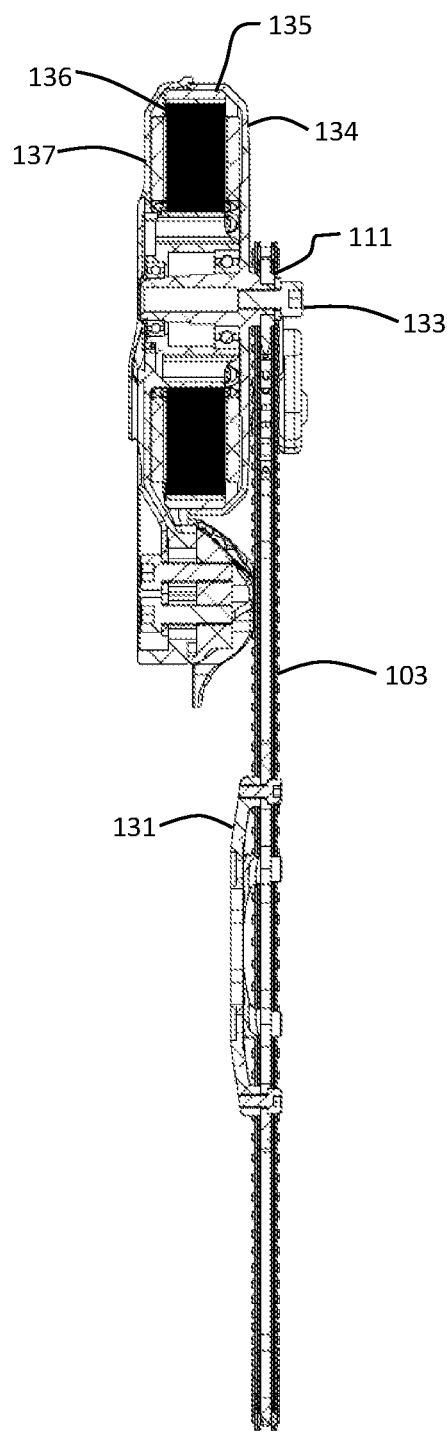
FIG. 5 is a side cross-sectional view of an electric bicycle motor system according to some embodiments of the present invention.

In some embodiments of the present invention, as seen in FIG. 4, the motor unit 101 is coupled to the bracket 110 with fasteners 122, 123. The outboard motor housing 137 may have a slot 124 adapted to allow for some adjustment of the position of the motor unit 101 relative to the bracket 110. FIG. 5 illustrates in cross-section the motor unit 101. In this view, the vertical alignment of the teeth of the pinion 111, the chain 103, and the teeth of the drive gear 102 are shown.

Figure 6A:
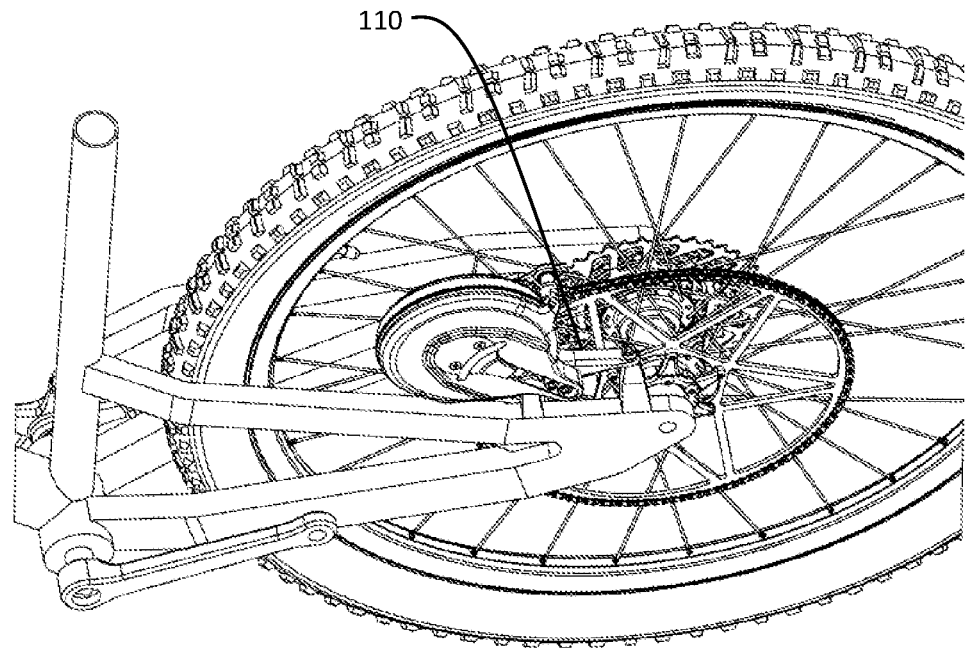
FIG. 6A is an isometric view of bicycle with an electric bicycle motor system mounted thereon according to some embodiments of the present invention.
Figure 6B:
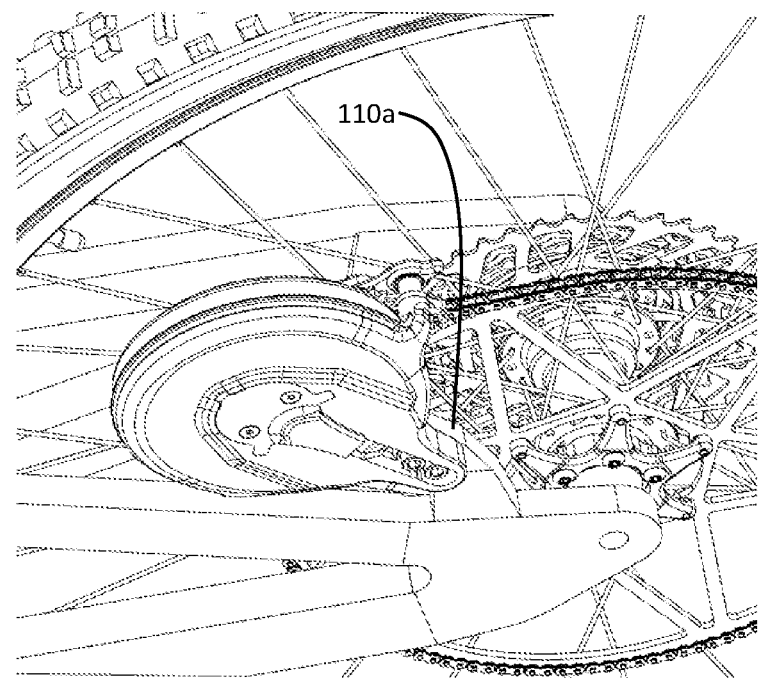
FIG. 6B is an isometric view of bicycle with an electric bicycle motor system mounted thereon according to some embodiments of the present invention.

FIGS. 6A and 6B illustrate varying embodiments of the mounting bracketry for a motor unit 101. FIG. 6A illustrates a bracket 110 which is coupled to the motor unit and also coupled the bicycle frame, and may be coupled to a disc brake caliper mounting interface in some aspects. FIG. 6B illustrates a bracket portion 110a which is part of the bicycle frame.

Although discussed in the context of a bicycle, in some aspects the present invention may be seen in something other than a bicycle, such as a tricycle with two front wheels and a single rear wheel.

Figure 7:
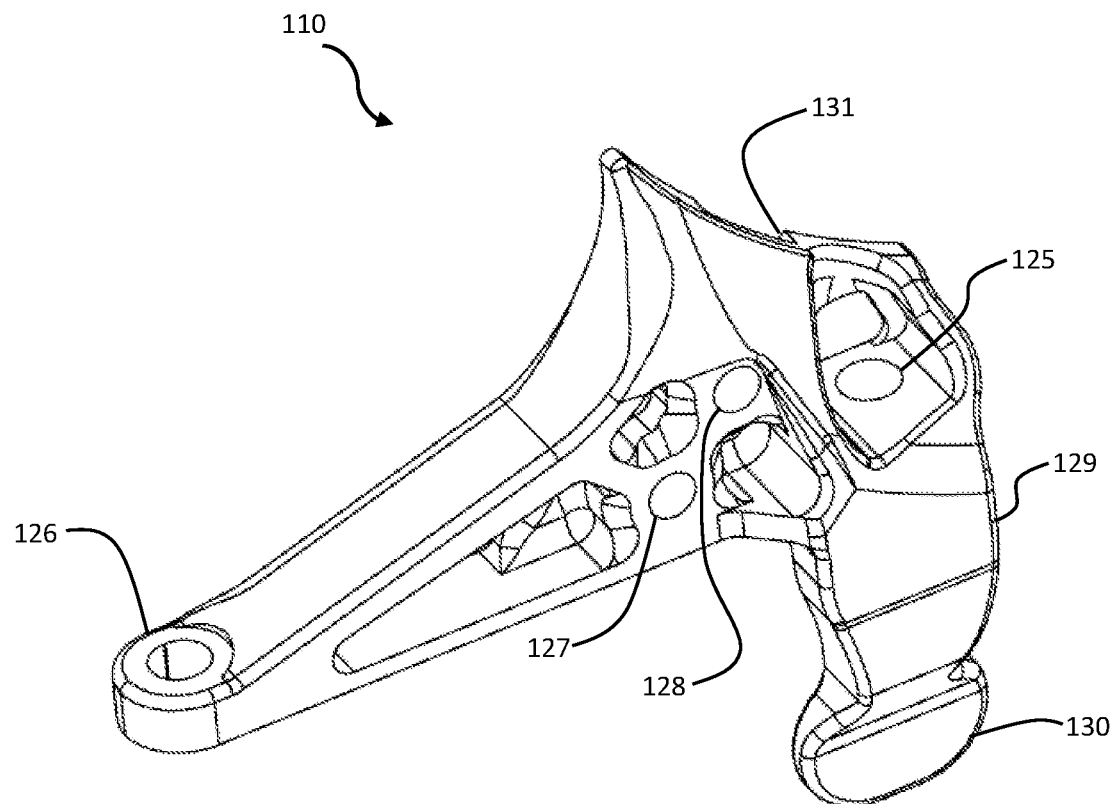
FIG. 7 is an isometric view of a mounting bracket for an electric bicycle motor according to some embodiments of the present invention.

FIG. 7 illustrates a mounting bracket 110 according to some embodiments of the present invention. The mounting bracket 110 includes through holes 125, 126 which may be sized to mate to an industry standard disc brake mounting interface. A slot 131 may accommodate a mating portion 152 of the outboard motor housing 137 of the motor unit 101, as illustrated in FIG. 8B. The fasteners 122, 123 which attach the motor unit to the bracket 110 may couple to receiving holes 127, 128, which may be threaded through holes in some aspects. In some aspects, the bracket 110 may have an extension arm 129 with a coupling pad 130 at its lower end. In some aspects, the coupling pad may reside against the bicycle frame to provide an additional support point adapted to offset moment loads which may be put into the bracket. In some aspects, the radial load through the pinion may result in some loads which are not in the plane defined by the axis of the two receiving holes 127, 128. In some aspects, a spacer may be bonded or otherwise affixed to the bicycle frame to provide a contact fit of the coupling pad 130 of the bracket 110 to the bicycle frame.

Figure 8A:
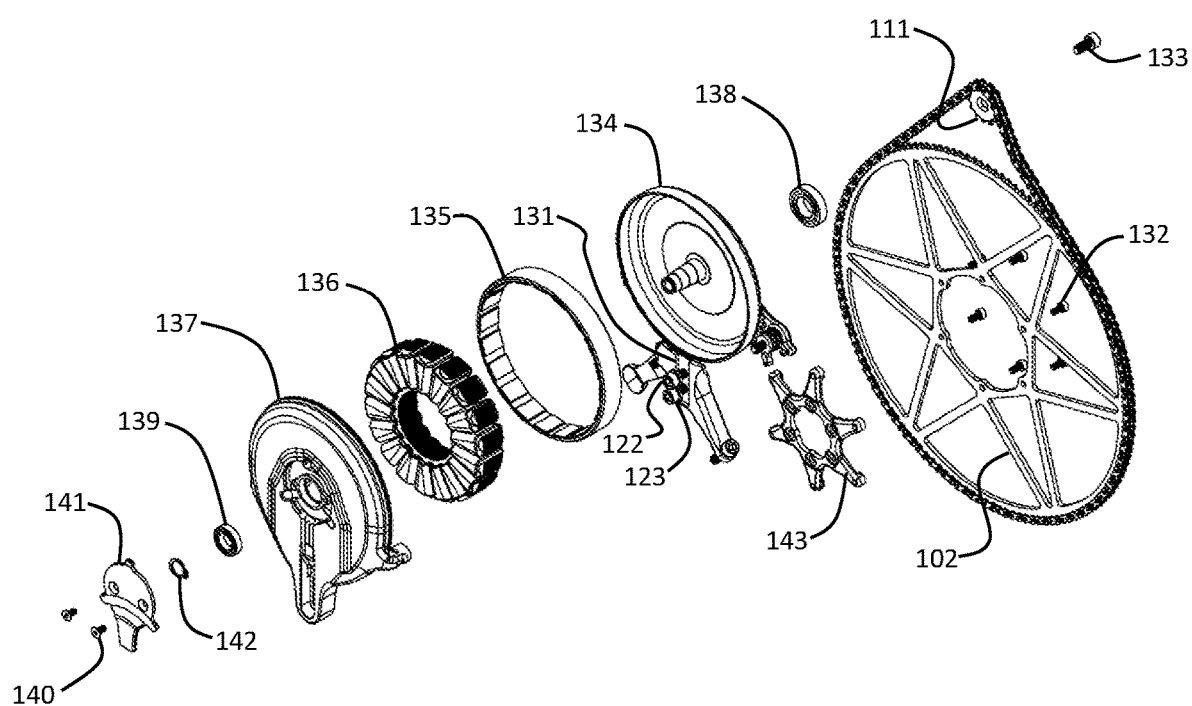
FIG. 8A is an exploded isometric view of an electric bicycle motor system according to some embodiments of the present invention.
Figure 8B:
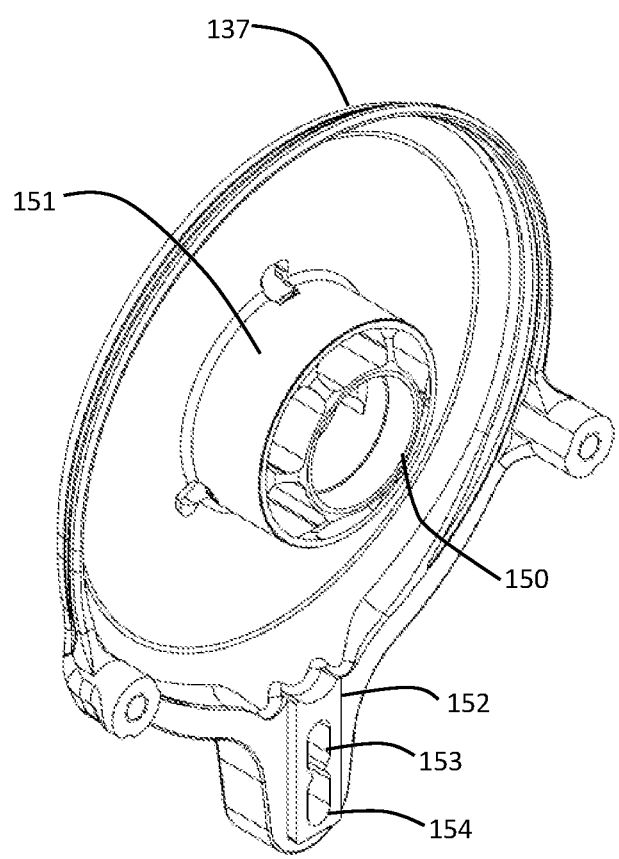
FIG. 8B is an interior view of a motor housing according to some embodiments of the present invention.

FIG. 8A illustrates an exploded view of an electric bicycle system 100 according to some embodiments of the present invention. A drive gear 102 is coupled to a drive gear mount 143 with fasteners 132. The drive gear mount 131 may be adapted to interface with an industry standard rear disc mount on a rear wheel hub. A stationary outer motor housing 137 is coupled to the internal stator 136. The internal stator 136 may have windings and winding bars. An outboard bearing 139 resides within an outboard recess in the outer motor housing 137 and an inboard bearing 138 resides within an inboard recess in the outer motor housing. The outboard bearing 139 and the inboard bearing 138 support a motor shaft which is integral to the rotating inner motor housing 134. A retainer 142 is coupled to the shaft of the inner housing 134 and axially constrains the inner housing and the outer housing relative to each other. A removable cover 141 is coupled to the outer housing 137 with fasteners 140, and allows for access to the retainer 142 and the outer bearing 139. The motor pinion 111 is mounted directly onto an integral interfacing shaft extending from the inner motor housing 134 and is coupled to the housing with a fastening coupler 133. An exterior rotor 135 is coupled to the inner housing 134. The outer housing 137 is coupled to the bracket 110 with fasteners 122, 123 and resides within a slot 131 which allows for some fitting of the bracket to the motor unit along the direction of the main axis of the slot 131. FIG. 8B further illustrates details of the outer housing 137 according to some embodiments of the present invasion. The outer housing 137 may include an axial support portion 151 with a bearing receiver portion 150 adapted to support the outer race of the inner bearing 138. A sliding form 152 is adapted to reside within the slot 131 in the bracket 110, or other brackets. Slots 153, 154 in the outer housing 137 allow for relative motion to the mounting fasteners 122, 123.

In some aspects, the motor is a brushless direct current motor (BLDC). In some aspects, the motor is an outrunner BLDC motor. In such a motor, the motor spins an outer rotor around its windings. The motor shell has magnets on the inside lining and the stator contains a laminate stack of steel plates with the motor windings on the teeth. In some aspects, the motor is a disc shaped motor. In some embodiments of the present invention, the motor stator has a stator diameter of greater than 2 times the laminate stack thickness. In some embodiments of the present invention, the motor stator has a stator diameter of greater than 4 times the laminate stack thickness. In some embodiments of the present invention, the motor stator has a stator diameter of greater than 6 times the laminate stack thickness. In some embodiments, the stator stack height is less than 30 mm. In some embodiments, the stator stack height is less than 20 mm.

In some aspects, as seen in FIG. 8, there is no directional clutch typically seen with drive only electric bicycle systems. As there may be some motor drag when coasting the bicycle without such a clutch, in order to provide a frictionless feel the drive electronics may provide a minimum amount of drive power to the motor while the bicycle is coasting.

Figure 9:
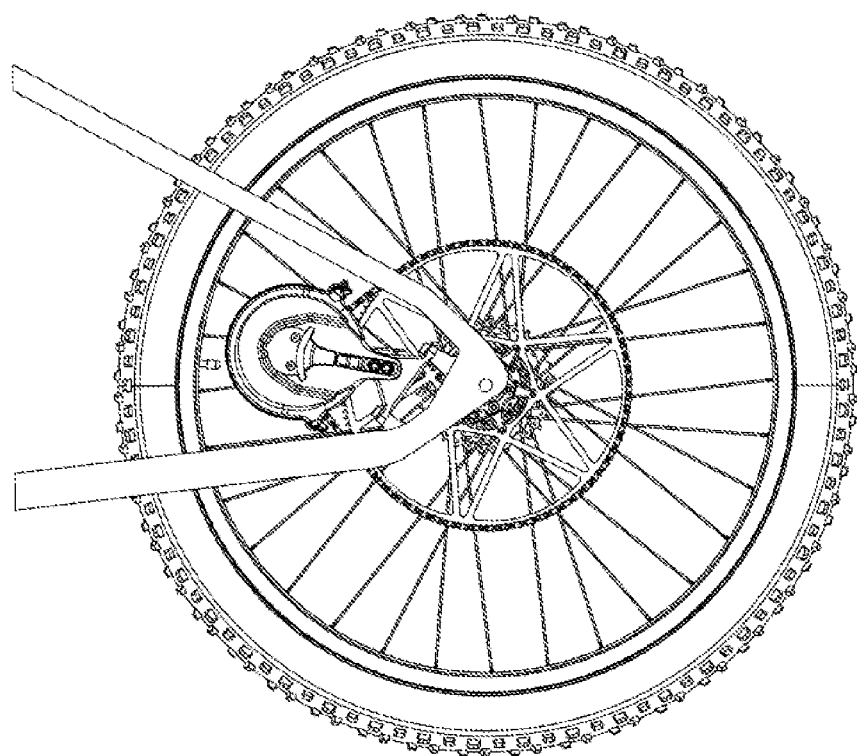
FIG. 9 is a left side view of a bicycle with an electric bicycle motor system mounted thereon according to some embodiments of the present invention.
Figure 10:
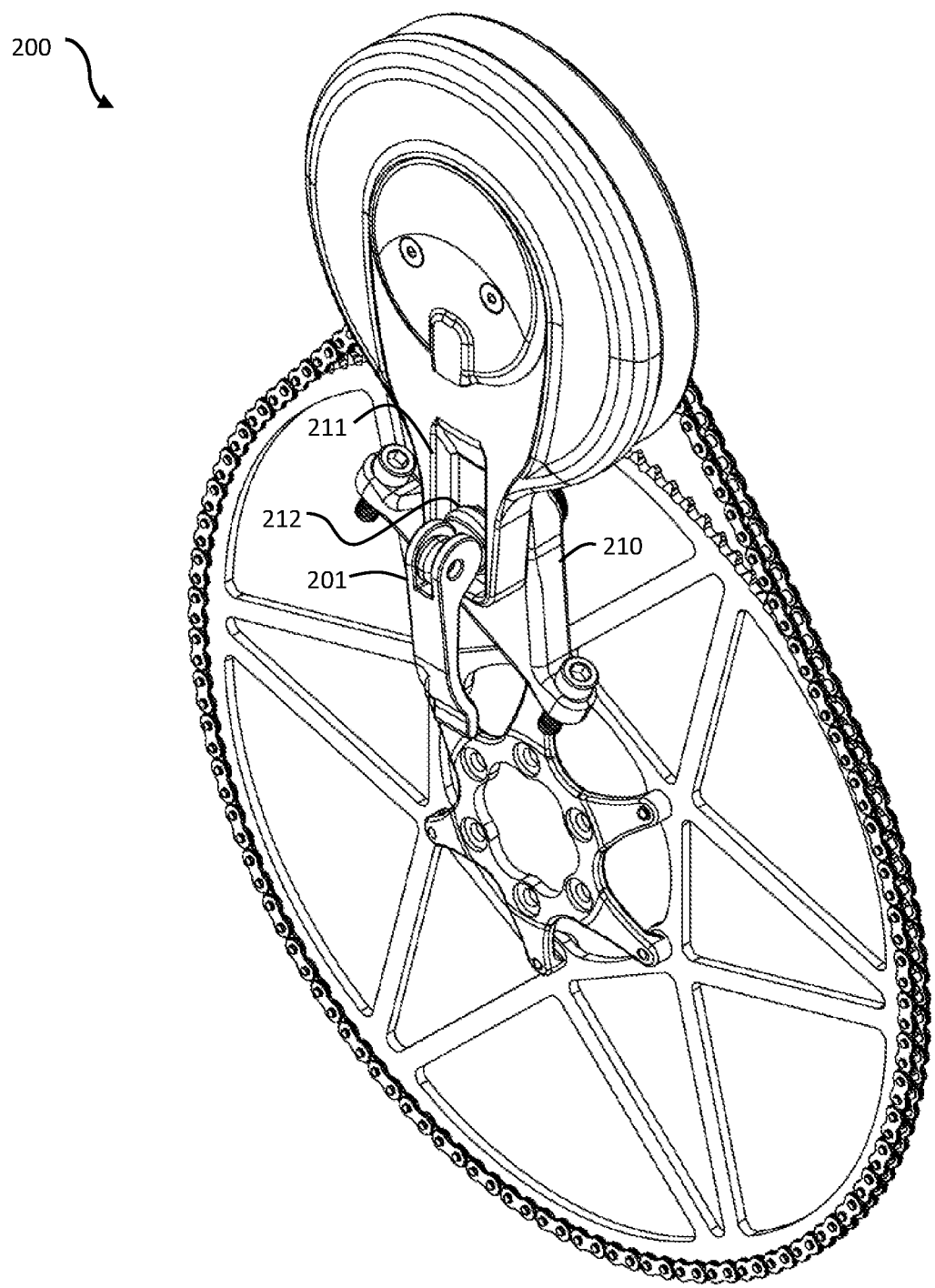
FIG. 10 is an isometric view of an electric bicycle motor system according to some embodiments of the present invention.
Figure 11:
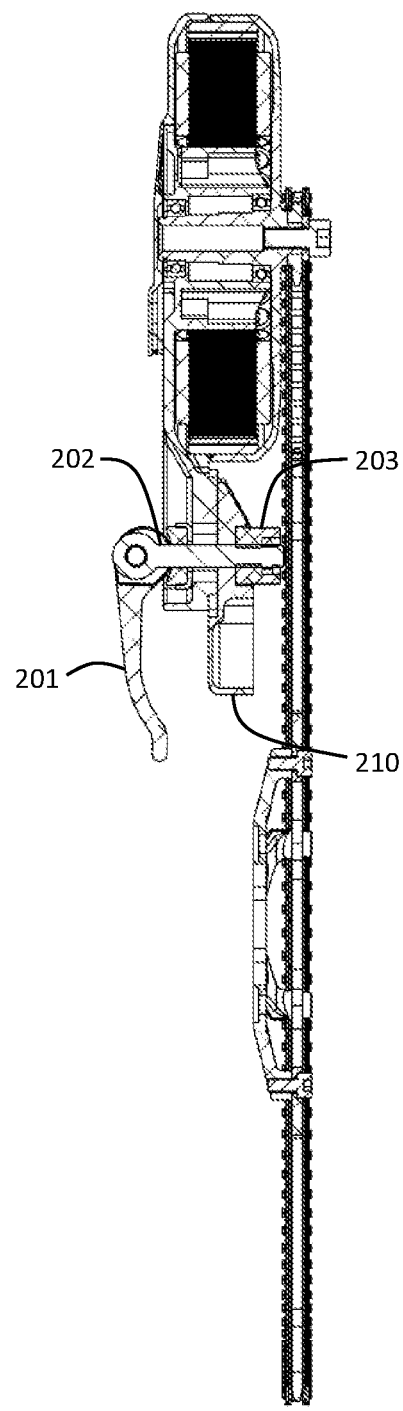
FIG. 11 is a side cross-sectional view of an electric bicycle motor system according to some embodiments of the present invention.

In some embodiments of the present invention, as seen in FIG. 9, the motor unit is mounted between the rear stay and the chain stay. Similarly to other embodiments described herein, the motor rotational axis is forward of the rotational axis of the rear wheel and rearward of the forward most portion of the rear rim.

In embodiments of the present invention, the electric bicycle system would further include a battery, a motor controller, and the associated wiring harnesses coupling the motor, the battery, and the motor controller together. In some aspects, the battery is a pack composed of lithium ion cells. These cells provide for large energy storage in a small and light weight package. In some aspects, other types of energy storage such and as a lead acid battery, fuel cell, or other means of energy storage could be utilized.

Motor controllers take energy from the battery and convert it into a controllable form to be utilized to drive an electric motor. Motor controllers can have other functions such as processing rider input or controlling other functions. Motor controllers may also have the ability to take energy generated by the motor and convert it to a form to put the energy into the battery. These types of motor controllers are generally referred to as controllers capable of regeneration or regen, but numerous names and types are possible. In some aspects, the electric bicycle system would include a regen capable motor controller.

Figure 18:
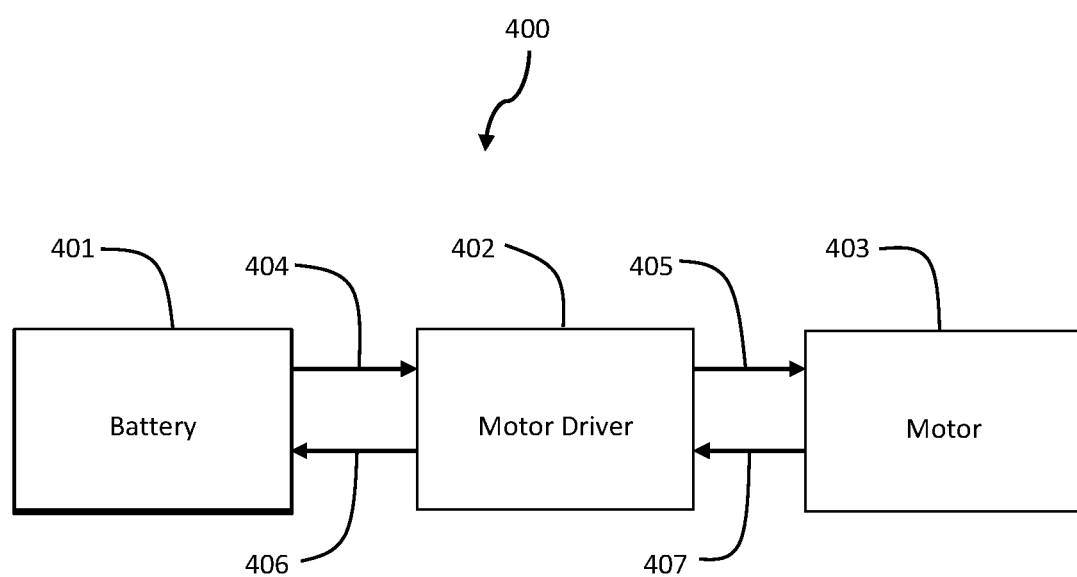
FIG. 18 is a flow chart of the motor and battery system according to some embodiments of the present invention.

FIG. 18 illustrates an electric subsystem 400 which may be used in conjunction with electric bicycle systems according to some embodiments of the present invention. A battery 401 is coupled to a motor controller/driver 402, which in turn is coupled to a motor 403. In a drive scenario, the battery provides power 404 to the motor controller/driver, which then may modulate the power and provide it 405 to the motor 403. In a regenerative braking scenario, the motor may provide power 407 through the motor driver/controller 402 and on to 406 the battery 401.

In another exemplary embodiment of the present invention, as seen in FIG. 9, an electric bicycle system is mounted in a location below the rear stay of the bicycle frame. In other embodiments, the location of the motor could also be above or below the chain stay. Additional embodiments may or may not have chain stays or seat stays at all, or there could be asymmetric stays that exist or not exist only on one left or right side. Numerous examples of structures connecting the rear wheel to the rest of the bicycle frame are possible.

In other embodiments, the rearward portion of the bicycle frame might be moveable in order to provide suspension. This is sometimes, but not exclusively, referred to as rear suspension.

Figure 12:
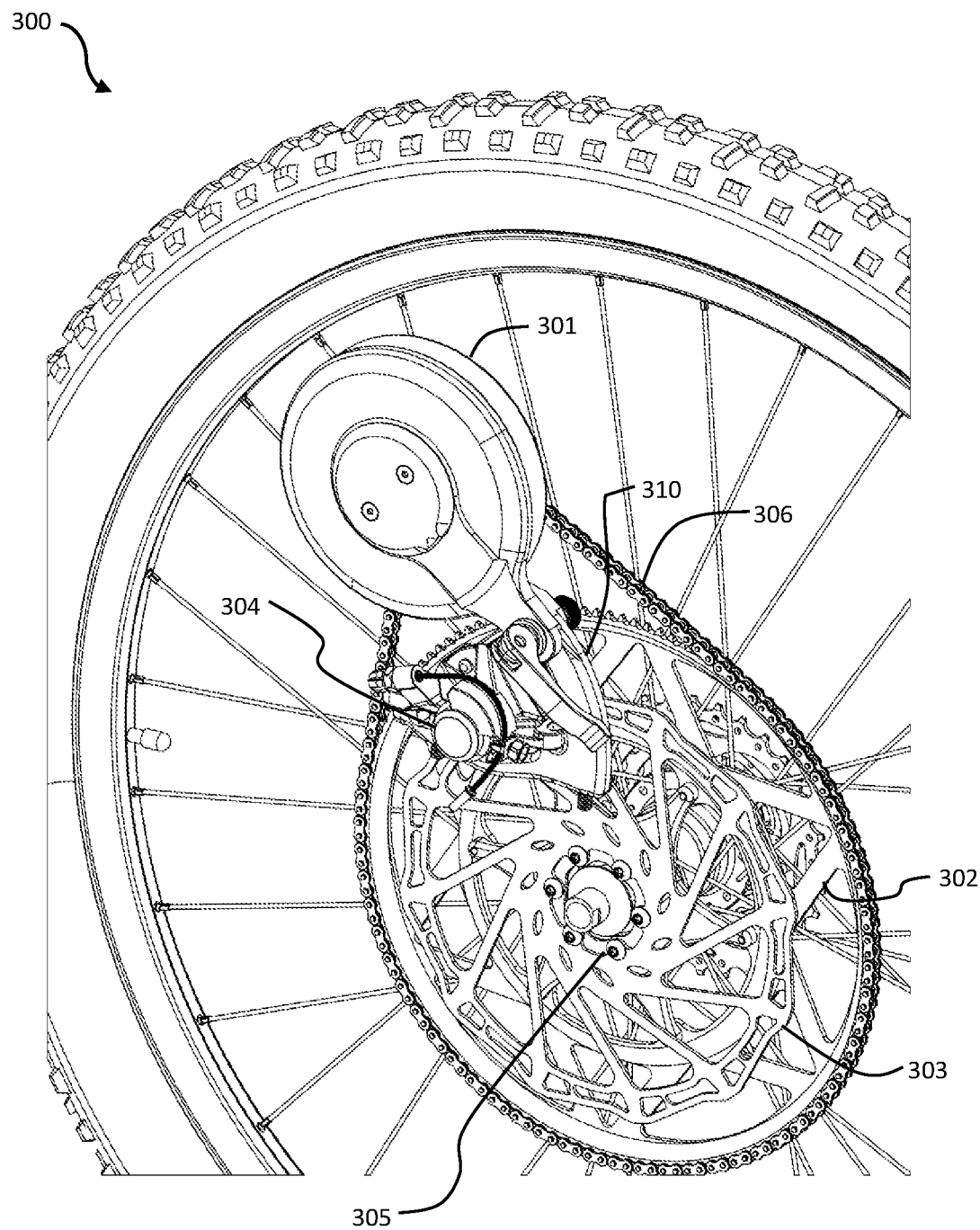
FIG. 12 is an isometric view of an electric bicycle motor system with a disc brake according to some embodiments of the present invention.
Figure 13:
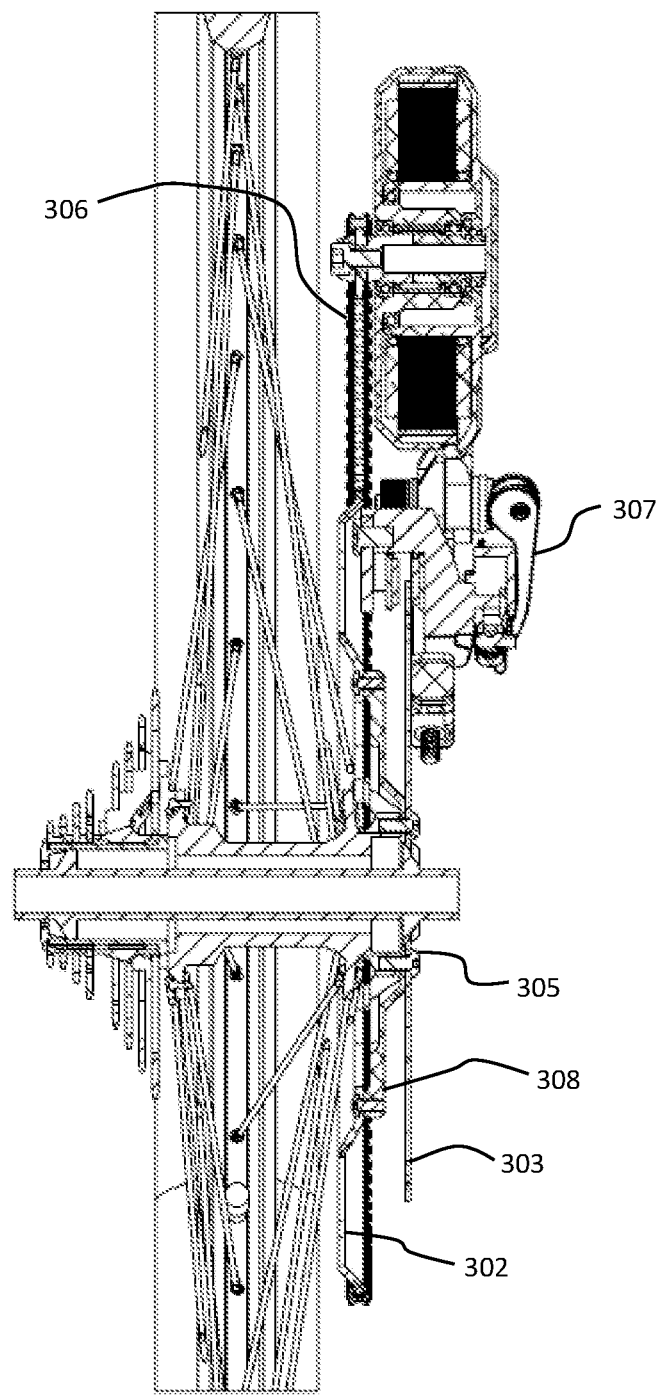
FIG. 13 is a cross-sectional view of an electric bicycle motor system with a disc brake according to some embodiments of the present invention.

In some embodiments of the present invention, as seen in FIG. 12, an electric bicycle system 300 incorporates a disc brake system incorporated into the electric drive system. A motor unit 301 is coupled to a bicycle with a mounting bracket 310. A chain 306 drives a drive gear 302 in a similar fashion to the above described embodiments. The gear mounting bracket 308 supports the drive gear 302 and also supports a brake disc 303. The fasteners 305 which attach the bracket 308 may also attach the disc 303. A disc brake caliper mechanism 304 may be also supported by the bracket 310 and is adapted to provide clamping force onto the disc 303 to provide braking to the wheel. As seen in cross-section in FIG. 13, the thin profiles of the components allow for the fit of the combined motor and disc brake assembly with similar avoidance of the tire, wheel, the crank, and the user in accord with embodiments described above.

Figure 14:
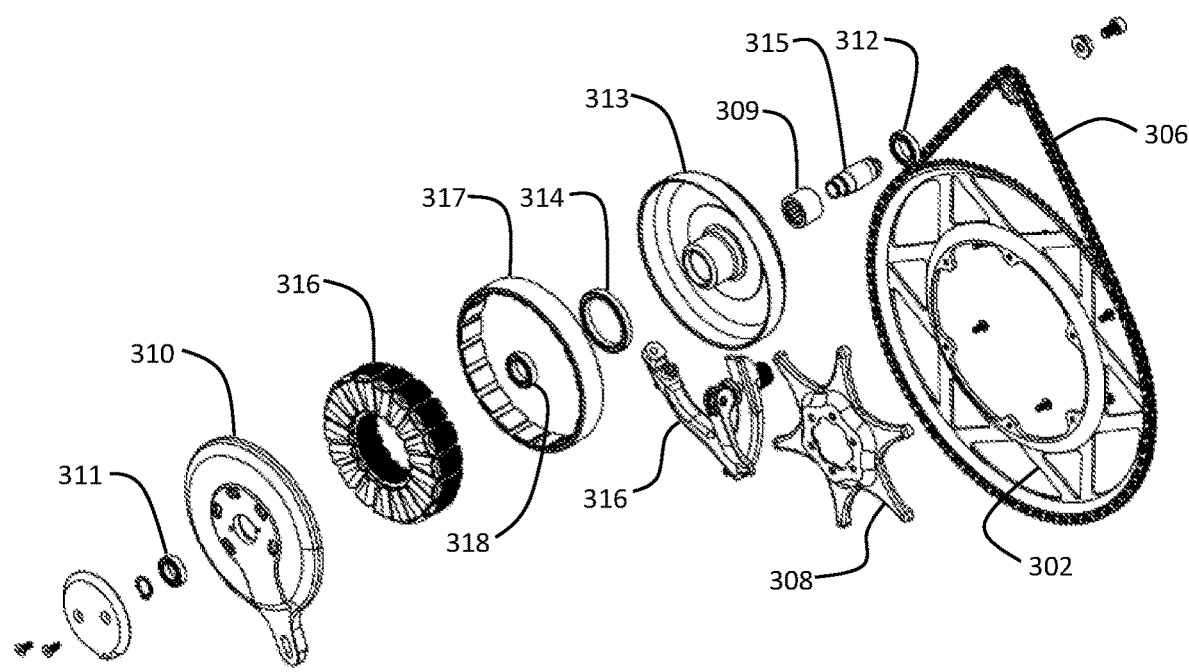
FIG. 14 is an exploded isometric view of an electric bicycle motor system according to some embodiments of the present invention.

FIG. 14 illustrates an exploded view of the electric bicycle system 300. In some aspects, the motor unit may have a directional clutch 308 adapted to allow for the motor to transmit torque in the drive direction, but to free-spin to allow relative rotational freedom between the motor and the drive gear when the motor is not driving the drive gear. An outer housing 310 is coupled to an internal stator 316, while the inner housing 313 is coupled to an exterior rotor 317. A shaft 309 couples to the interior of the clutch 309 and is supported by bearings 311, 312. An outer shaft is formed in the inner housing 313 and couples to the exterior of the clutch 309. The outer shaft is supported by bearings 318, 314, to provide support of the inner housing 313 relative to the outer housing 310. A chain 306 drives the drive gear 302, which is supported by a bracket 308. The disc utilizes the same mounting fasteners as the bracket 308 and is attached to the disc mounting interface of the wheel hub.

Figure 15:
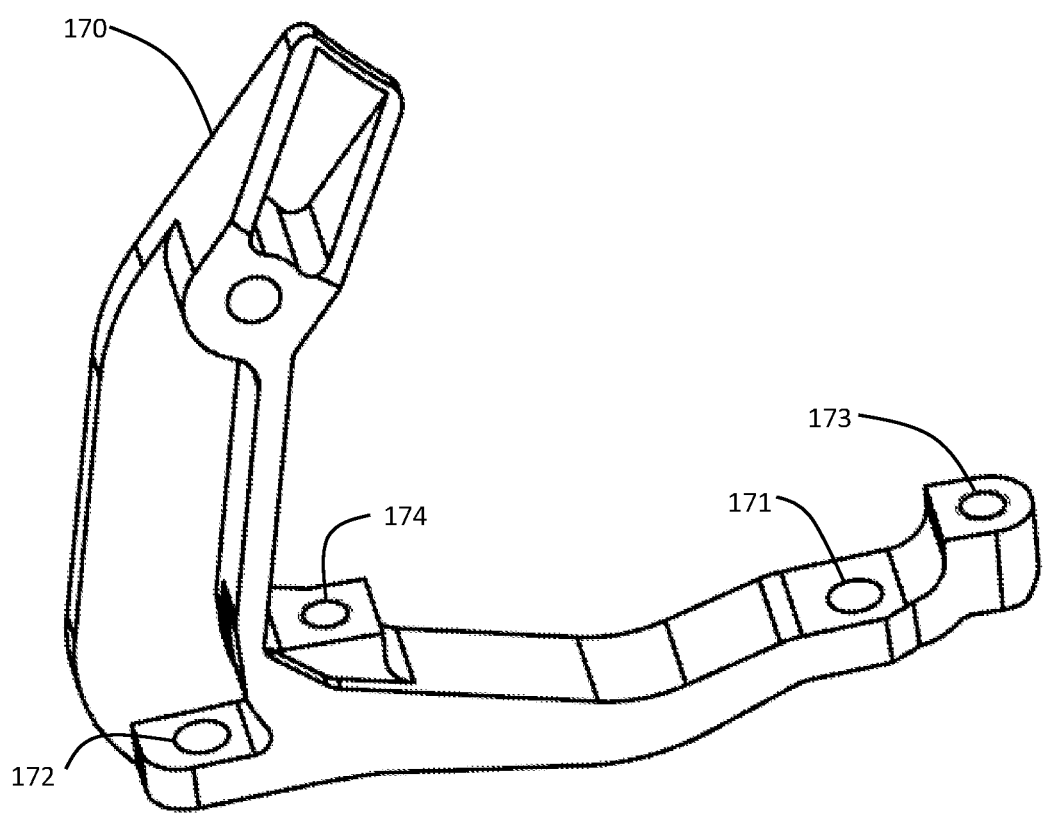
FIG. 15 is an isometric view of a mounting bracket for an electric bicycle motor according to some embodiments of the present invention.

FIG. 15 illustrates a mounting bracket 170 according to some embodiments of the present invention. This style of mounting bracket is made to facilitate the mounting of both a motor and a disc brake caliper to a frame. The mounting bracket 170 includes through holes 171, 172 which may be sized to mate to an industry standard disc brake mounting interface on a frame. Additional holes 173 and 174 are provided to remount a disc brake caliper in an alternate position that may be compliant with a caliper mounting standard. That standard may be for a smaller or larger disc rotor.

Figure 16:
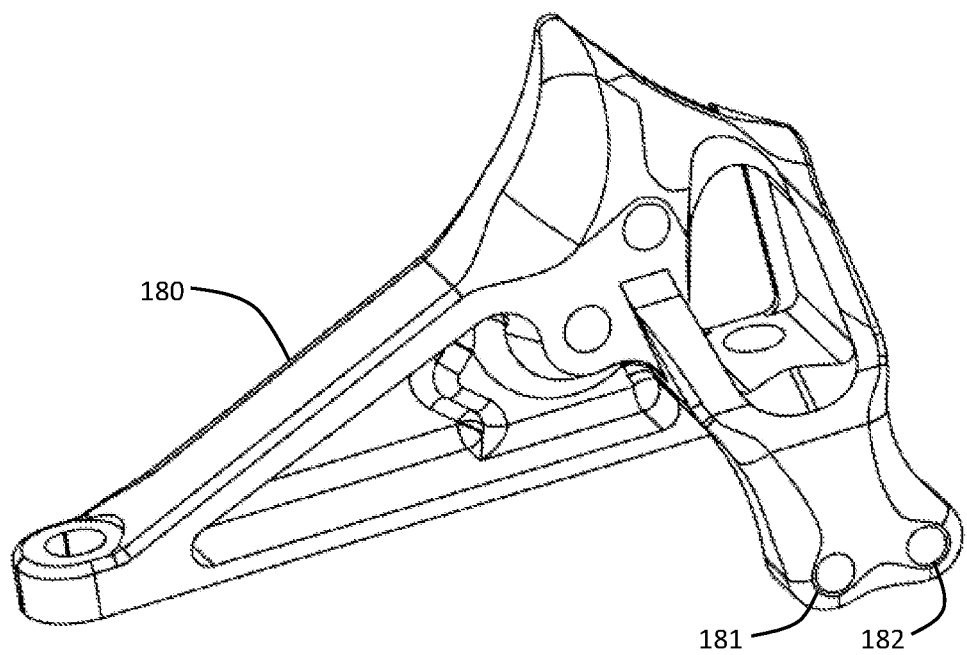
FIG. 16 is an isometric view of a mounting bracket for an electric bicycle motor according to some embodiments of the present invention.

FIG. 16 illustrates a mounting bracket 180 according to some embodiments of the present invention. This style of mounting bracket is a variation of the bracket shown in FIG. 7, but includes threaded holes 181 and 182. Threaded fasteners such as set screws or screws may be mounted in these holes in order to provide multiple points of contact with the frame that are adjustable.

Figure 17A:
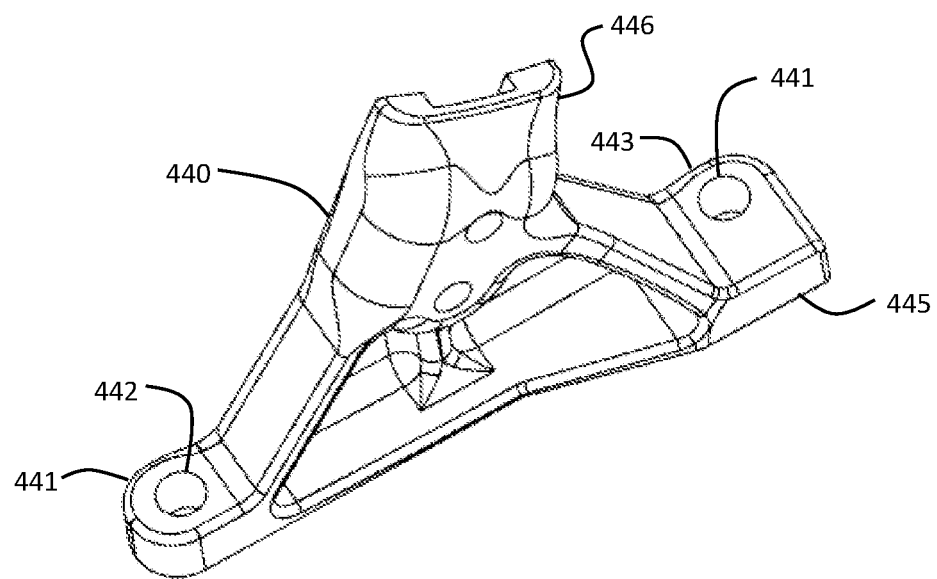
FIG. 17A illustrates a bracket according to some embodiments of the present invention.
Figure 17B:
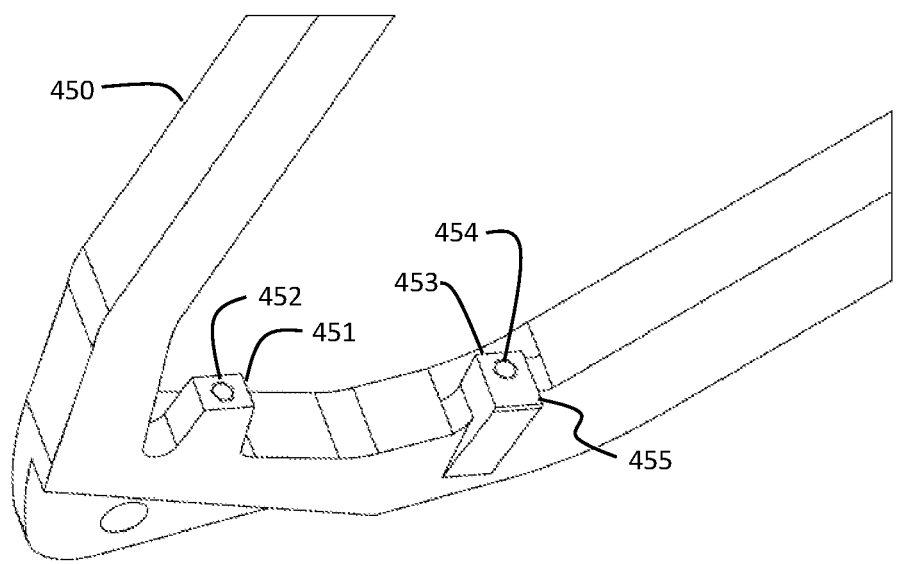
FIG. 17B illustrates a mounting interface according to some embodiments of the present invention.

In some embodiments of the present invention, as seen in FIGS. 17A and 17B, an enhanced mounting system is used. A bracket 440 has an interface portion 446 adapted to interface with a motor unit. A first mounting 441 has a through hole 442 adapted to receive a fastener which may fasten the bracket 440 to the bicycle frame. A second mounting 443 has a through hole 441 adapted to receive a fastener which may fasten the bracket 440 to the bicycle frame. A mounting pad portion 445 includes an extended interface area which provides increased lateral stability and load spreading when the bracket is mounted to its mating component. A bicycle frame rear portion 450 may include a bracket mounting area with a first mounting interface 451 with a fastener receiving portion 452. A second mounting interface 453 may include a second mounting interface 453 with an extended interface area 455 which may pair with the extended interface area of the mounting pad portion 445 of the bracket 440. In some aspects, the interface dimensions other than the extended pad portions are standard for a rear disc brake mounting interface.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. An electric bicycle system, said electric bicycle system comprising:
   a bicycle frame, said bicycle frame having a longitudinal axis;
   a rear wheel coupled to said bicycle frame, said rear wheel comprising:
      an axis of rotation;
      a first pedal drive side of said rear wheel coupled to a first side of said bicycle frame; and a second side or said rear wheel coupled to a second side of said bicycle frame;
a motor unit coupled to said bicycle frame, said motor unit comprising a low aspect ratio electric motor, wherein said low aspect ratio electric motor is a BLDC outrunner electric motor, wherein said motor comprises a motor stator, and wherein said motor stator has a stator diameter of greater than 2 times the laminate stack thickness, said motor having an axis of rotation, wherein said motor unit is coupled to said second side of said bicycle frame such that said axis of rotation of said motor is longitudinally forward of said axis of rotation of said rear wheel and within an outside diameter of said rear wheel;
an output gear coupled to said motor; and
a drive gear coupled to said second side of said rear wheel, said drive gear mechanically coupled to said output gear of said motor.

2. The electric bicycle system of claim 1 wherein said low aspect ratio electric motor is a BLDC outrunner electric motor, wherein said motor comprises a motor stator, and wherein said motor stator has a stator diameter of greater than 4 times the laminate stack thickness.

3. The electric bicycle system of claim 1 wherein said bicycle frame comprises a rear disc brake caliper mounting interface, and wherein said motor unit is coupled to said bicycle frame at said rear brake caliper mounting interface.

4. The electric bicycle system of claim 3 wherein said bicycle frame comprises a brake disc mounting interface along said second side of said bicycle frame, and wherein said drive gear is mounted to said brake disc mounting interface.

5. The electric bicycle system of claim 1 further comprising a chain, wherein said drive gear is mechanically coupled to said output gear of said motor with said chain.

6. The electric bicycle system of claim 1 further comprising a belt, wherein said drive gear is mechanically coupled to said output gear of said motor with said belt.

7. The electric bicycle system of claim 1 wherein said motor unit is adapted to function as a drive motor and a power regenerating brake.

8. The electric bicycle system of claim 5 wherein said motor unit is adapted to function as a drive motor and a power regenerating brake.

9. The electric bicycle system of claim 1 wherein said rear wheel comprises a central hub with a disc brake disc mounting interface, and wherein said drive gear is mounted to said disc brake mounting interface.

10. The electric bicycle system of claim 5 wherein said rear wheel comprises a central hub with a disc brake disc mounting interface, and wherein said drive gear is mounted to said disc brake mounting interface.

11. The electric bicycle system of claim 1 wherein said motor unit has an outside surface away from the center plane of the bicycle, and wherein said bicycle further comprises a pedal crank, said pedal crank having an furthermost outside surface away from the center plane of the bicycle, and wherein said outside surface of said motor unit resides approximately in line with or inboard from the furthermost outside surface of said pedal crank.

12. The electric bicycle system of claim 5 wherein said motor unit has an outside surface away from the center plane of the bicycle, and wherein said bicycle further comprises a pedal crank, said pedal crank having a furthermost outside surface away from the center plane of the bicycle, and wherein said outside surface of said motor unit resides approximately in line with or inboard from the furthermost outside surface of said pedal crank.

13. The electric bicycle system of claim 12 wherein said motor comprises a motor stator, and wherein said motor stator has a stator diameter of greater than 4 times the laminate stack thickness.

14. The electric bicycle system of claim 1 further comprising a motor controller, said motor controller coupled to said power source and to said motor unit, said motor controller adapted to power said motor as a drive motor in a first operating mode, said motor controller adapted to use said motor for regenerative braking in a second operating mode.

15. The electric bicycle system of claim 12 further comprising a motor controller, said motor controller coupled to said power source and to said motor unit, said motor controller adapted to power said motor as a drive motor in a first operating mode, said motor controller adapted to use said motor for regenerative braking in a second operating mode.

16. The electric bicycle system of claim 13 further comprising a motor controller, said motor controller coupled to said power source and to said motor unit, said motor controller adapted to power said motor as a drive motor in a first operating mode, said motor controller adapted to use said motor for regenerative braking in a second operating mode.

17. The electric bicycle system of claim 5 wherein the distance between the axis of rotation of the motor to the axis rotation of the drive gear is in the range of 150-230 mm.

18. The electric bicycle system of claim 12 wherein the distance between the axis of rotation of the motor to the axis rotation of the drive gear is in the range of 150-230 mm.

19. The electric bicycle system of claim 13 wherein the distance between the axis of rotation of the motor to the axis rotation of the drive gear is in the range of 150-230 mm.

20. The electric bicycle system of claim 5 further comprising a first chain idler sprocket along a first chain portion on a first side of said output gear of said motor.

21. The electric bicycle system of claim 20 wherein said first chain idler sprocket is a mounted on a spring loaded arm adapted to maintain tension on said chain.

22. The electric bicycle system of claim 21 further comprising a second chain idler sprocket applying tension to said chain along a second chain portion on a second side of said output gear of said motor.

23. The electric bicycle system of claim 14 further comprising:
a first chain tensioner applying tension to said chain along a first chain portion on a first side of said motor gear; and
a second chain tensioner applying tension to said chain along a second chain portion of a second side of said chain.

24. An electric bicycle motor system, said electric bicycle motor system comprising:
an electric motor;
a motor mount for said electric motor, wherein said motor mount is adapted to attach to a rear disc brake caliper mounting interface;
a motor output gear coupled to said electric motor;
a drive gear adapted to attach to a disc brake disc mounting interface of a bicycle wheel hub; and
a chain coupling said motor output gear to said drive gear; and
a first chain tensioner applying tension to said chain along a first chain portion on a first side of said motor gear; and a second chain tensioner applying tension to said chain along a second chain portion of a second side of said chain.

25. The electric bicycle motor system of claim 24 wherein said motor is a BLDC outrunner electric motor, and wherein said motor comprises a motor stator, and wherein said motor stator has a stator diameter of greater than 4 times the laminate stack thickness.

26. The electric bicycle motor system of claim 24 wherein said motor is a BLDC outrunner electric motor, and wherein said motor comprises a motor stator, and wherein said motor stator has a stator diameter of greater than 6 times the laminate stack thickness.

27. The electric bicycle motor system of claim 25 wherein the laminate stack thickness is less than 30 mm.

28. The electric bicycle motor system of claim 26 wherein the laminate stack thickness is less than 30 mm.

29. The electric bicycle motor system of claim 25 wherein the laminate stack thickness is less than 20 mm.

30. The electric bicycle motor system of claim 26 wherein the laminate stack thickness is less than 20 mm.

31. An electric bicycle system, said electric bicycle system comprising:
a bicycle frame, said bicycle frame having a longitudinal axis;
a rear wheel coupled to said bicycle frame, said rear wheel comprising:
an axis of rotation;
a first pedal drive side coupled to a pedal drive side of said bicycle frame; and
a second side coupled to a second side of said bicycle frame;
a motor unit coupled to said bicycle frame, said motor unit comprising a low aspect ratio electric motor, said motor having an axis of rotation, wherein said motor unit is coupled to said second side of said bicycle frame such that said axis of rotation of said motor is longitudinally forward of said axis of rotation of said rear wheel and within an outside diameter of said rear wheel;
a disc brake caliper unit coupled to said frame, wherein said disc brake caliper unit is coupled to said frame via said motor unit;
an output gear coupled to said motor;
a drive gear coupled to said second side of said rear wheel, said drive gear mechanically coupled to said output gear of said motor; and
a brake disc coupled to said second side of said rear wheel.

32. The electric bicycle system of claim 31 wherein said drive gear and said brake disc are coupled to a brake disc mounting interface of said rear wheel.

33. The electric bicycle system of claim 31 further comprising a chain, wherein said drive gear is mechanically coupled to said output gear of said motor with said chain.

34. The electric bicycle system of claim 31 wherein said low aspect ratio electric motor is a BLDC outrunner electric motor, wherein said motor comprises a motor stator, and wherein said motor stator has a stator diameter of greater than 4 times the laminate stack thickness.

35. The electric bicycle system of claim 31 wherein said motor unit further comprises a directional clutch.

36. The electric bicycle system of claim 31 wherein said electric bicycle system further comprises a directional clutch.

37. The electric bicycle system of claim 31 further comprising a motor controller, said motor controller coupled to said power source and to said motor unit, said motor controller adapted to power said motor as a drive motor in a first operating mode, said motor controller adapted to use said motor for regenerative braking in a second operating mode.

38. An electric bicycle system, said electric bicycle system comprising:
a bicycle frame, said bicycle frame having a longitudinal axis;
a motor unit coupled to said bicycle frame, said motor unit comprising a low aspect ratio electric motor, wherein said low aspect ratio electric motor is a BLDC outrunner electric motor, wherein said motor comprises a motor stator, and wherein said motor stator has a stator diameter of greater than 2 times the laminate stack thickness, said motor having an axis of rotation, wherein said motor unit is coupled to said second side of said bicycle frame such that said axis of rotation of said motor is longitudinally forward of said axis of rotation of said rear wheel and within an outside diameter of a rear wheel to be used with said bicycle frame;
an output gear coupled to said motor; and
a drive gear, said drive gear mechanically coupled to said output gear of said motor.

39. The electric bicycle system of claim 38 wherein said low aspect ratio electric motor is a BLDC outrunner electric motor, wherein said motor comprises a motor stator, and wherein said motor stator has a stator diameter of greater than 4 times the laminate stack thickness.

40. The electric bicycle system of claim 38 wherein said bicycle frame comprises a rear disc brake caliper mounting interface, and wherein said motor unit is coupled to said bicycle frame at said rear brake caliper mounting interface.

41. The electric bicycle system of claim 1 further comprising a chain, wherein said drive gear is mechanically coupled to said output gear of said motor with said chain.

* * * * *